US00RE50014E

(19) United States
(12) Reissued Patent
Chu et al.

(10) Patent Number: US RE50,014 E
(45) Date of Reissued Patent: Jun. 18, 2024

(54) AIR CLEANER AND HOME APPLIANCE HAVING AIR PROCESSING UNIT

(71) Applicant: SAMSUNG ELECTRONICS CO., LTD., Suwon-si (KR)

(72) Inventors: Euy Sung Chu, Seongnam (KR); Tae Yong Lee, Suwon (KR); Won Choe, Yongin (KR); Hyeong Joon Seo, Suwon (KR); Woo Seog Song, Yongin (KR)

(73) Assignee: SAMSUNG ELECTRONICS CO., LTD., Suwon-si (KR)

(21) Appl. No.: 17/683,764

(22) Filed: Mar. 1, 2022

Related U.S. Patent Documents

Reissue of:
(64) Patent No.: 10,583,384
Issued: Mar. 10, 2020
Appl. No.: 14/940,326
Filed: Nov. 13, 2015

(30) Foreign Application Priority Data

Dec. 30, 2014 (KR) ..... 10-2014-0194087

(51) Int. Cl.
*B01D 46/58* (2022.01)
*B01D 46/00* (2022.01)
(Continued)

(52) U.S. Cl.
CPC ..... *B01D 46/58* (2022.01); *B01D 46/0002* (2013.01); *B01D 46/0041* (2013.01);
(Continued)

(58) Field of Classification Search
CPC ..... B01D 46/58; B01D 46/0002; B01D 46/0041; B01D 46/50; F24F 1/0071; F24F 8/108
See application file for complete search history.

(56) References Cited

U.S. PATENT DOCUMENTS 4,526,592 A * 7/1985 Armbruster ..... F24F 3/1603 454/906
5,117,652 A * 6/1992 Takeuchi ..... F24F 1/025 62/291
(Continued)

FOREIGN PATENT DOCUMENTS

CN 1637355 7/2005
CN 101046315 10/2007
(Continued)

OTHER PUBLICATIONS

Translation of KR 10-2006-0052606 . . . (Year: 2006).*
(Continued)

*Primary Examiner* — Patricia L Engle
(74) *Attorney, Agent, or Firm* — STAAS & HALSEY LLP

(57) ABSTRACT

Disclosed is an air cleaner having independent fluid paths and a home appliance having the air cleaner. The air cleaner includes a front panel having a plurality of air inlets formed thereon for air to flow in from outside of the case, first and second blower devices arranged inside the case to allow air to flow in through the plurality of air inlets, first and second filter units arranged to filter the air flowing in by the first and second blower devices, a first outlet located on the case to release the air, a second outlet formed at a different location from that of the first outlet, a first fluid path formed between one of the plurality of air inlets and the first outlet; and a second fluid path formed between another of the plurality of air inlets and the second outlet.

27 Claims, 14 Drawing Sheets

(51) Int. Cl.
*B01D 46/50* (2006.01)
*F24F 1/0071* (2019.01)
*F24F 8/108* (2021.01)

(52) U.S. Cl.
CPC ..... *B01D 46/50* (2013.01); *F24F 1/0071* (2019.02); *F24F 8/108* (2021.01); *Y02A 50/20* (2018.01)

(56) References Cited

U.S. PATENT DOCUMENTS

| | | | | | |
|---|---|---|---|---|---|
| 5,264,015 | A * | 11/1993 | Matsui | F24F 3/1603 | 55/467 |
| 5,348,563 | A * | 9/1994 | Davis | F24F 3/1603 | 55/385.2 |
| 6,701,741 | B2 * | 3/2004 | Liu | F24F 1/027 | 62/429 |
| 6,926,762 | B2 * | 8/2005 | Kim | A61L 9/16 | 55/343 |
| 7,244,290 | B2 * | 7/2007 | Vandenbelt | B03C 3/32 | 96/16 |
| 7,291,205 | B2 * | 11/2007 | Chu | F24F 3/1411 | 422/186.3 |
| 7,566,353 | B2 | 7/2009 | Lanker et al. | | |
| 8,747,526 | B2 * | 6/2014 | Huang | F24F 3/166 | 96/16 |
| 8,784,540 | B2 * | 7/2014 | Rubit | B01D 45/06 | 55/467.1 |
| 8,974,565 | B2 * | 3/2015 | Cecchi | B01D 46/42 | 55/350.1 |
| 9,440,240 | B2 * | 9/2016 | Mills | B03C 3/017 | |
| 9,694,308 | B2 * | 7/2017 | Michael | B01D 46/42 | |
| 2006/0177356 | A1 * | 8/2006 | Miller | A61L 9/16 | 422/121 |
| 2006/0240764 | A1 * | 10/2006 | Pierce | F24F 1/0071 | 454/329 |
| 2007/0137489 | A1 * | 6/2007 | Luo | A61L 9/16 | 96/224 |
| 2007/0221061 | A1 * | 9/2007 | Steiner | B03C 3/32 | 96/63 |
| 2013/0055692 | A1 * | 3/2013 | Cecchi | B01D 46/42 | 55/344 |
| 2013/0206009 | A1 | 8/2013 | Huang et al. | | |
| 2014/0216259 | A1 * | 8/2014 | Iwaki | F24F 3/166 | 96/19 |
| 2015/0306533 | A1 * | 10/2015 | Matlin | B01D 46/448 | 96/420 |

FOREIGN PATENT DOCUMENTS

| | | | | |
|---|---|---|---|---|
| CN | 101440981 | | 5/2009 | |
| CN | 101803797 | B * | 3/2012 | |
| CN | 103930730 | | 7/2014 | |
| CN | 203687282 | U * | 7/2014 | |
| CN | 104023817 | | 9/2014 | |
| CN | 104033959 | | 9/2014 | |
| CN | 104110814 | | 10/2014 | |
| DE | 20-2013-103846 | U1 | 9/2013 | |
| DE | 202013103846 | U1 * | 9/2013 | H02B 1/565 |
| JP | 2006-167614 | A | 6/2006 | |
| JP | 2008-309368 | A | 12/2008 | |
| JP | 2010-17685 | A | 1/2010 | |
| JP | 2013-72583 | A | 4/2013 | |
| JP | 2013-217580 | A | 10/2013 | |
| KR | 10-2004-0025269 | A | 3/2004 | |
| KR | 10-2004-0026321 | A | 3/2004 | |
| KR | 10-2004-0056151 | | 6/2004 | |
| KR | 10-2005-0030661 | A | 3/2005 | |
| KR | 10-2005-0048870 | A | 5/2005 | |
| KR | 10-2005-0091172 | | 9/2005 | |
| KR | 10-2005-0118948 | A | 12/2005 | |
| KR | 10-2006-0010231 | A | 2/2006 | |
| KR | 10-2006-0014141 | A | 2/2006 | |
| KR | 20060014141 | A * | 2/2006 | |
| KR | 10-2006-0019656 | A | 3/2006 | |
| KR | 10-2006-0019660 | A | 3/2006 | |
| KR | 20060019656 | A * | 3/2006 | |
| KR | 20060019660 | A * | 3/2006 | |
| KR | 10-2006-0037110 | A | 5/2006 | |
| KR | 10-2006-0052606 | | 5/2006 | |
| KR | 10-2006-0052606 | A | 5/2006 | |
| KR | 10-2006-0119068 | A | 11/2006 | |
| KR | 100654724 | B1 * | 11/2006 | |
| KR | 10-0734987 | B1 | 7/2007 | |
| KR | 10-2008-0070920 | A | 8/2008 | |
| KR | 10-2012-001784 | A | 1/2012 | |
| KR | 10-1152684 | | 6/2012 | |
| KR | 10-2012-0136137 | A | 12/2012 | |
| WO | 2010/144088 | A1 | 12/2010 | |

OTHER PUBLICATIONS

Office Action dated Dec. 21, 2022, in Korean Application No. 10-2022-0013126.
Office Action dated Mar. 2, 2023, in Korean Application No. 10-2022-0013126.
Office Action dated May 23, 2017 in U.S. Appl. No. 14/940,326.
Office Action dated Oct. 23, 2017 in U.S. Appl. No. 14/940,326.
Advisory Action dated Jan. 22, 2018 in U.S. Appl. No. 14/940,326.
Office Action dated Sep. 10, 2018 in U.S. Appl. No. 14/940,326.
Office Action dated Feb. 20, 2019 in U.S. Appl. No. 14/940,326.
Advisory Action dated Apr. 12, 2019 in U.S. Appl. No. 14/940,326.
Office Action dated Jul. 8, 2019 in U.S. Appl. No. 14/940,326.
Notice of Allowance dated Nov. 14, 2019 in U.S. Appl. No. 14/940,326.
Office Action dated Apr. 19, 2022, issued in Korean Application No. 10-2022-001326.
Notice of Allowance dated Oct. 28, 20021 issued in Korean Application No. 10-2014-0194087.
Office Action dated Apr. 16, 2021 issued in Korean Application No. 10-2014-0194087.
Office Action dated Jun. 11, 2020 issued in Korean Application No. 10-2019-0040703.
Office Action dated Aug. 26, 2022, in Korean Application No. 10-2022-0013126.
Office Action dated Oct. 20, 2023, in Korean Application No. 10-2023-0071101.
Extended European Search Report dated May 2, 2016 in corresponding European Patent Application No. 15198259.2.
Chinese Office Action dated May 27, 2019 in Chinese Patent Application No. 201511024502.9.
Korean Office Action dated Jul. 4, 2019 in Korean Patent Application No. 10-2019-0047691.
European Communication under Rule 71(3) dated May 23, 2019 in European Patent Application No. 15198259.2.

* cited by examiner

AIR CLEANER AND HOME APPLIANCE HAVING AIR PROCESSING UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue application of U.S. Pat. No. 10,583,384, issued Mar. 10, 2020, which* claims the benefit under 35 U.S.C. § 119(a) of a Korean patent application filed on Dec. 30, 2014 in the Korean Intellectual Property Office and assigned Serial No. 10-2014-0194087, the entire [disclosure] *disclosures* of which [is incorporated] *are* hereby incorporated by reference.

BACKGROUND

1. Field

The present disclosure relates to home appliances, and more particularly, to an air cleaner and home appliance having an air processing unit.

2. Description of the Related Art

Recently, home appliances requiring various features for air conditioning, such as air conditioners, air cleaners, humidifiers, dehumidifiers, etc., are on the rise. Air cleaners are indoor devices to filter out or sterilize fine dust in the air.

Specifically, the air cleaner sucks up contaminated room air, filters out dust, odor particles, etc., to purify them into clean air, and emit the clean air from the air cleaner back to the room.

The air cleaner may include a main body, and air inlet and outlet built in the main body.

The air inlet is usually mounted on the rear side of the main body, which arises a problem that purification performance of the air cleaner may drop when the air cleaner is placed close to the wall for use.

Furthermore, integrated air flow through the air inlet and outlet may degrade spatial or environmental controllability.

SUMMARY

The present disclosure provides an air cleaner having independent fluid paths and a home appliance having an air processing unit.

According to the present disclosure, an air cleaner may include a front panel having a plurality of air inlets formed thereon for air to flow in from outside the case, a first blower device arranged inside the case to force air to flow through one of the plurality of air inlets, a first filter unit arranged to filter the air forced to flow through one of the plurality of air inlets by the first blower device, a first outlet located on the case to release the air that passed through the first filter unit out of the case and a first fluid path formed between the one of the plurality of air inlets and the first outlet.

The air cleaner may also include a second blower device arranged inside the case to force air to flow through other one of the plurality of air inlets, a second filter unit arranged to filter the air forced to flow through the other one of the plurality of air inlets by the second blower device, a second outlet located on the case to release the air that passed through the second filter unit out of the case, and a second fluid path separated from the first fluid path and formed between the other one of the plurality of air inlets and the second outlet.

The present disclosure also provides an air cleaner having a frontal inflow fluid path free from spatial constraint and multi-directional outflow fluid paths, and a home appliance including the air cleaner having the independent fluid paths and an air processing unit.

The present disclosure also provides an air cleaner having multi-directional independent fluid paths for different individual control, and a home appliance including the air cleaner having the independent fluid paths and an air processing unit.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Figure 1:
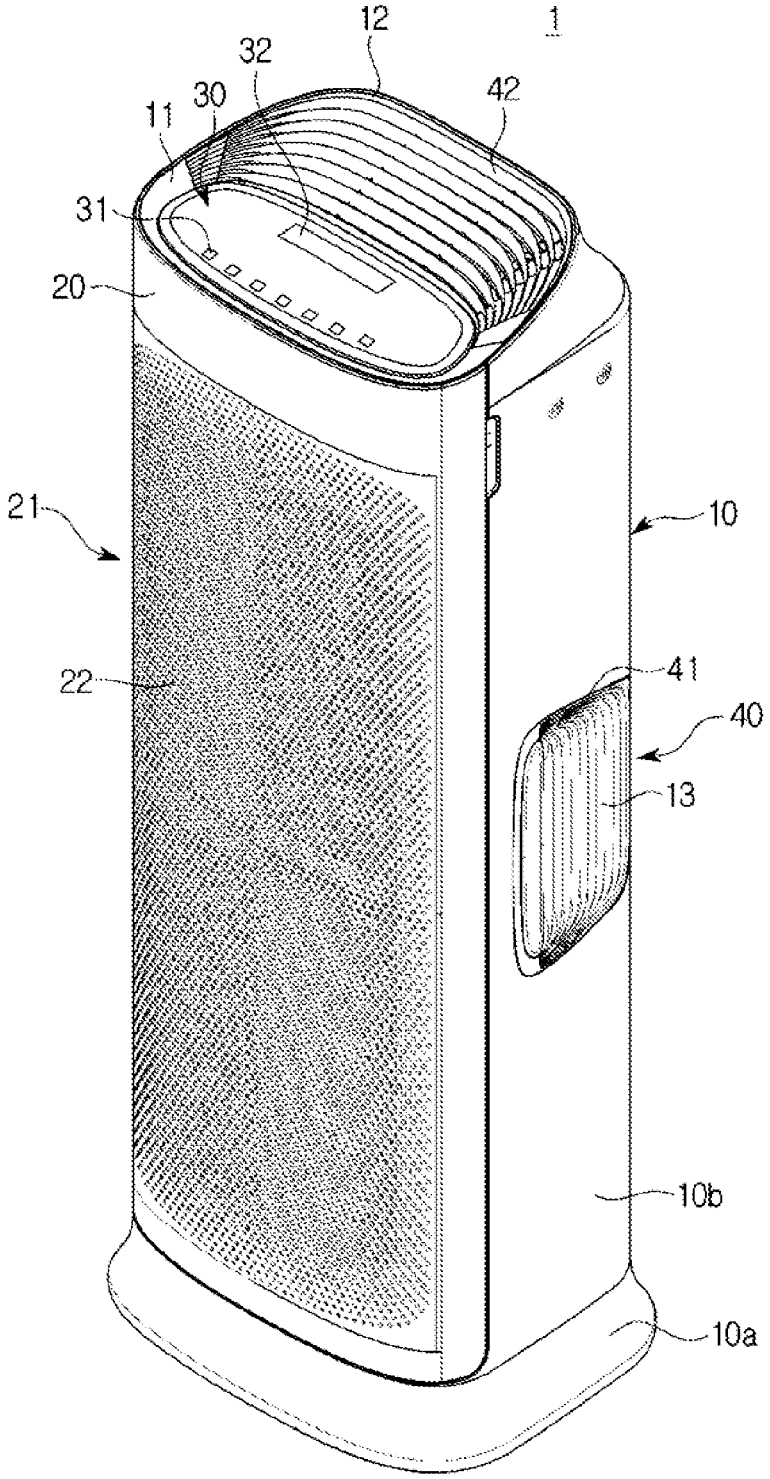
FIG. 1 is a perspective view of an air cleaner, according to an embodiment of the present disclosure.

Reference will now be made in detail to embodiments, examples of which are illustrated in the accompanying drawings, wherein like reference numerals refer to the like elements throughout. The terms "front", "rear", "upper", "lower", "top", and "bottom" as herein used are defined with respect to the drawings, but the terms may not restrict the shape and position of the respective components.

Embodiments of the present disclosure may be applied for all home appliances that may drive or control respective functions with independent fluid paths formed and may be intended to gain best efficiencies.

An air cleaner will now be taken as an example.

FIG. 1 is a perspective view of an air cleaner, according to an embodiment of the present disclosure.

Referring to FIG. 1, an air cleaner 1 includes a case 10 that constitutes the exterior of the air cleaner 1, and a front panel 20 combined on the front of the case 10 to constitute the front part of the air cleaner 1.

The case 10 may include a back panel 10b that constitutes the back, a bottom panel 10a that constitutes the bottom, and a top panel 11 that constitutes the top. The back panel 10b is shown to have the back integral with both sides, but the present disclosure is not limited thereto. For example, left and right side panels that constitute both sides of the air cleaner 1 may further be included.

The front panel 20 may be shaped like a plate of a size that matches the back panel 10b.

The front panel 20 is shown to be separately formed and combined on the front of the case 10, but the present disclosure is not limited thereto. For example, the front panel may be formed to be integral with the case.

An air inlet 21 is formed on the front panel 20, through which room air flows in from outside. The air inlet 21 may be formed to include a plurality of inlet holes 22 evenly distributed on the entire front face of the front panel 20.

The air inlet 21 may include a first air inlet 21a arranged in the lower part of the front panel 20 and a second air inlet 21b arranged in the upper part of the front panel 20.

The air inlet 21 is evenly formed across the entire front area of the front panel 20: the first air inlet 21a is formed in the lower part of the area and the second air inlet 21b is formed in the upper part of the area, but the present disclosure is not limited thereto. For example, the air inlet 21 may be irregularly formed on a particular part of the front panel 20.

The air inlet 21 of the front panel 20 may be formed such that room air may flow from the front face of the case 10 toward the inside of the case 10.

The air flowing to the inside of the case 10 through the air inlet 21 may be released out through an air outlet 40.

The air outlet 40 may include a first outlet 41 and a second outlet 42. The first outlet 41 may be mounted on either sides of the back panel 10b of the case 10. The second outlet 42 may be mounted on the top of the case 10.

The second outlet 42 may be mounted on the top panel 11 that constitutes the top face of the case 10.

The top panel 11 may be combined on the top of the case 10 to constitute the top of the air cleaner 1.

The top panel 11 may include a control unit 30 having a button control unit 31 for inputting commands to operate the air cleaner 1 and a display unit 32 for displaying an operating state.

Furthermore, the top panel 11 may have a size that matches the second outlet 42, and may include outlet grills 12 and outlet grills 12 and 13 control an amount of air to be released from inside of the case 10. While the outlet grills 12 and 13 in this embodiment are shown to be in the form of a streamlined blade that is slanted toward the front, the present disclosure is not limited thereto. For example, the outlet grill may have various forms, including a V-shaped or H-shaped form.

The outlet grills 13 may also be installed on the first outlet 41 mounted on the back panel 10b of the case 10. The outlet grills 12 and 13 may be formed to match the shape and size of the outlet 40.

Figure 2:
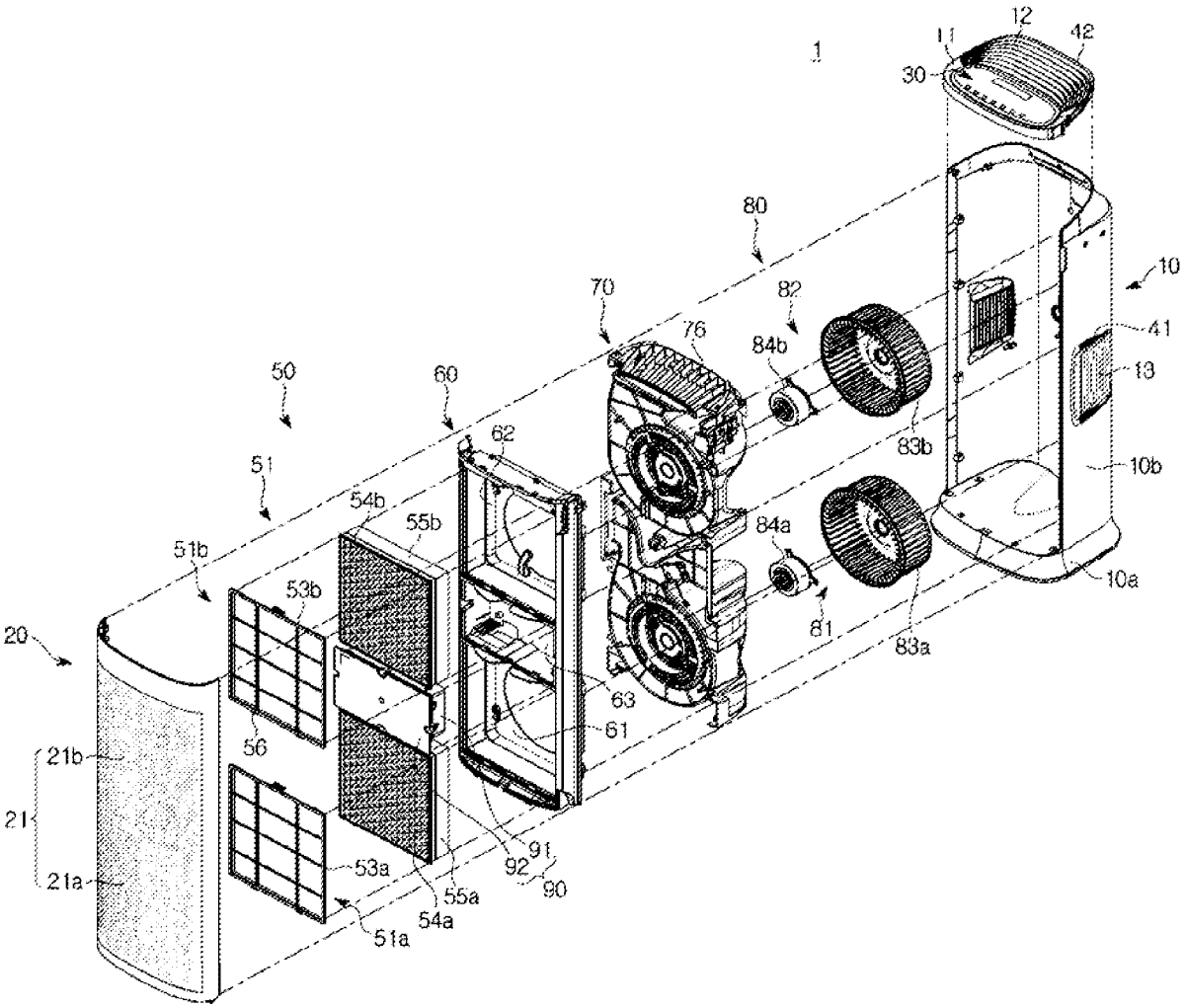
FIG. 2 is an exploded view schematically illustrating an air cleaner, according to an embodiment of the present disclosure.
Figure 3:
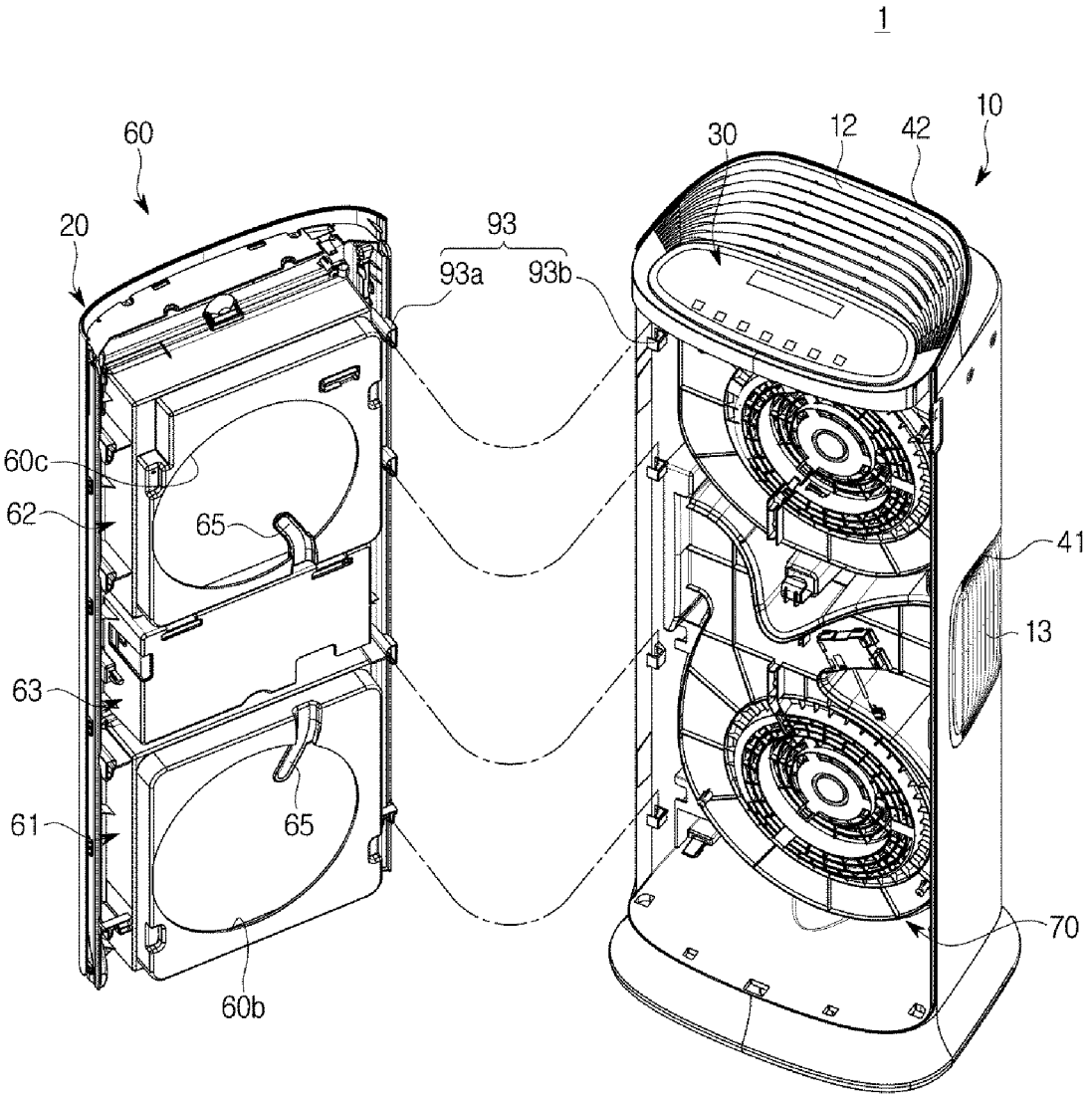
FIG. 3 shows combination of a case and a filter frame of an air cleaner, according to an embodiment of the present disclosure.
Figure 4:
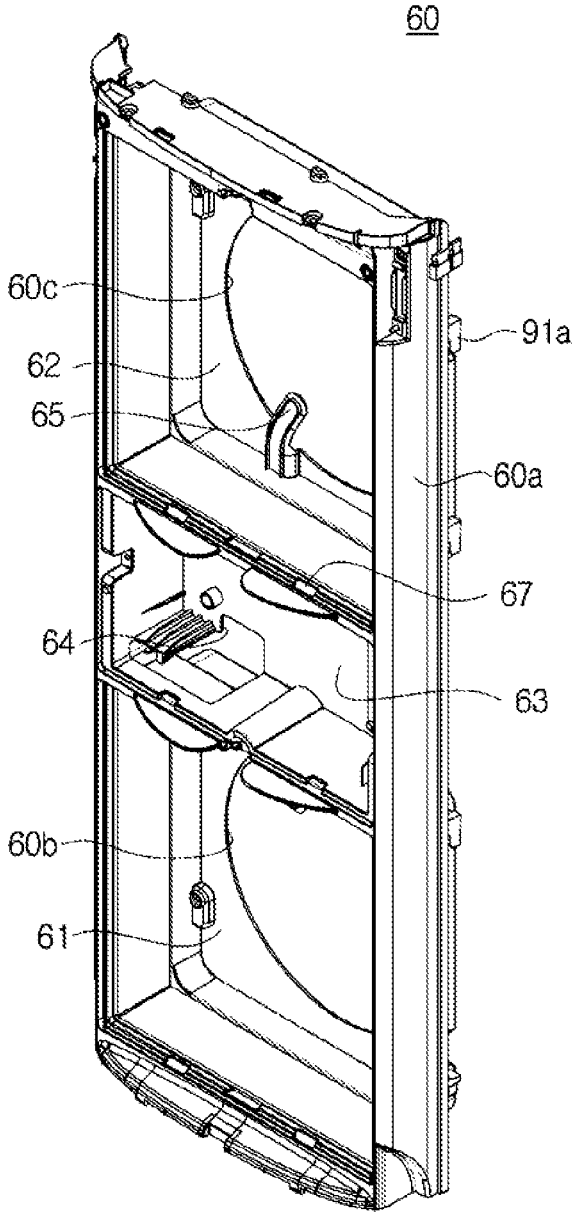
FIG. 4 is a perspective view schematically illustrating a filter frame, according to an embodiment of the present disclosure.
Figure 5:
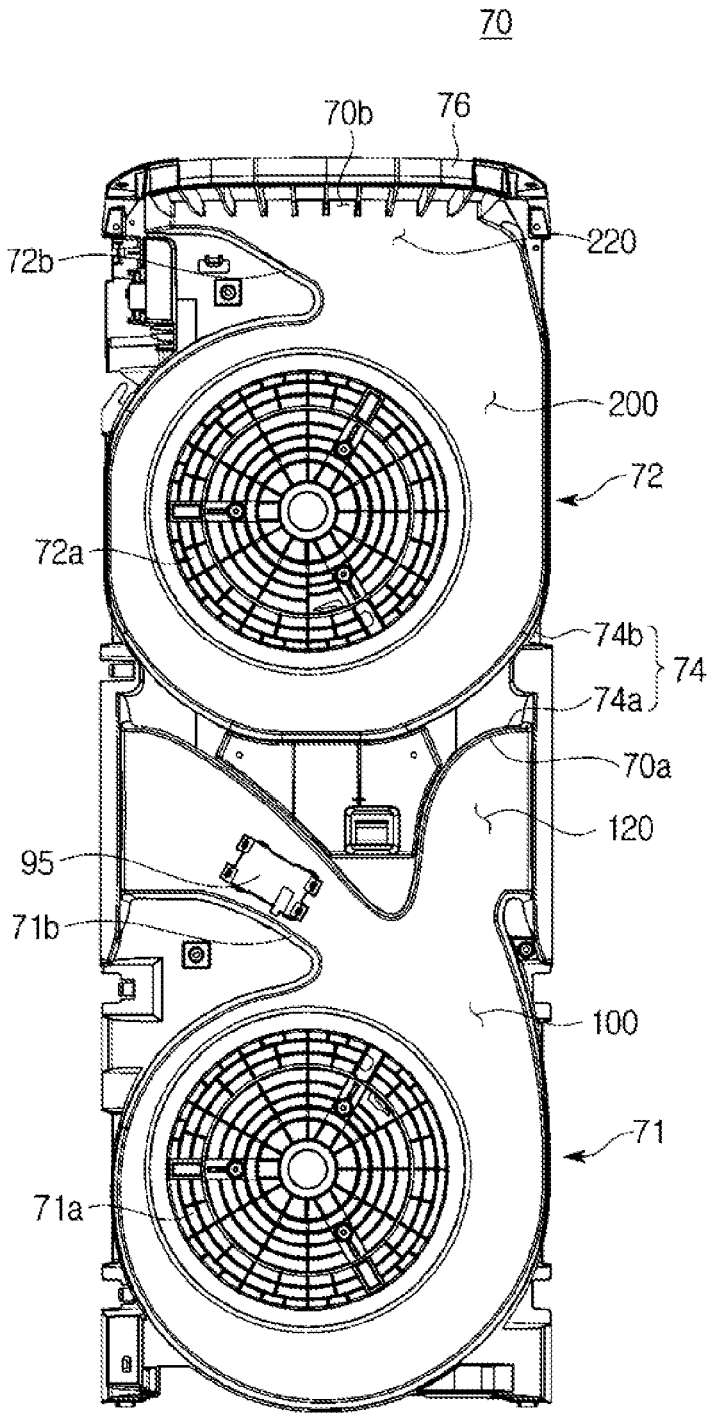
FIG. 5 is a perspective view schematically illustrating a duct unit, according to an embodiment of the present disclosure.

FIG. 2 is an exploded view schematically illustrating an air cleaner, according to an embodiment of the present disclosure, FIG. 3 shows combination of a case and a filter frame of an air cleaner, according to an embodiment of the present disclosure, FIG. 4 is a perspective view schematically illustrating a filter frame, according to an embodiment of the present disclosure, and FIG. 5 is a perspective view schematically illustrating a duct unit, according to an embodiment of the present disclosure.

Referring to FIGS. 2 to 5, the air cleaner 1 may include a filter unit 50, a blower device 80, and a duct unit 70 including an outlet 76, which are installed inside the case 10.

The filter unit 50 is equipped inside the case 10 for filtering out air flowing in through the air inlet 21 of the front panel 20.

The filter unit 50 may include a first filter 51a formed to pass the air flowing in through the first air inlet 21a of the front panel 20, and a second filter 51b formed to pass the air flowing in through the second air inlet 21b.

The first filter 51a may be arranged in the lower part inside the case 10, and the second filter 51b may be arranged in the upper part inside the case 10.

The filter unit 50 may be fixed on the filter frame 60. The filter frame 60 is combined to the case 10 and fixes the filter unit 50 not to deviate therefrom.

Configurations and operations of the first and second filters 51a and 51b may be assumed to be the same, so only the first filter 51a will now be described as an example.

The first filter 51a may include a filter cover frame 55a, a filter cover 53a, and a filter member 54a.

The filter cover frame 55a is formed for the first filter unit 51a to be combined with the filter frame 60, and the filter cover 53a is formed for the filter member 54a to be fixed to the filter cover frame 55a. The filter cover 53a is combined on the front opening of the filter cover frame 55a to prevent the filter member 54a from being deviated from the filter frame 60.

The filter cover 53a may include multiple ribs that are shaped like a net with a big-sized mesh to pass the inflowing air. Furthermore, in the bottom of the filter cover 53a, there are fixed projections 56 extending forward to be detachably combined with the filter frame 60.

The filter member 54a serves to filter out or sterilize dust from the inflowing air, and there are no limitations on the shape or material of the filter member 54a.

The filter member 54a may include a free filter (not shown) having a net body with a relatively big-sized mesh to filter out dust with big particles, a dust collection filter (not shown) for collecting fine dust, and a deodorization filter (not shown) containing e.g., granular activated carbon to remove a foul smell.

The filter frame 60 includes a housing 60a that constitutes its exterior, a first filter installation unit 61 placed in the lower part of the housing 60a, a second filter installation unit 62 placed in the upper part of the housing 60a, and a circuit-unit installation unit 63 arranged between the first and second filter installation units 61 and 62.

The front face of the housing 60a may be opened for the filter unit 50 to be attachable/detachable. On the open front of the housing 60a, the filter cover 53a of the filter unit 50 may be combined.

Fixing grooves 67 may be formed to be combined with the fixing projections 56 of the filter cover 53a.

The first filter installation unit 61 is formed for the first filter 51a to be installed therein. The first filter installation unit 61 includes a first filter hole 60b formed on the back of the housing 60a.

The first filter hole 60b is formed for air that passed through the first filter 51a to move toward the blower device 80.

A supporter 65 may be formed in the first filter hole 60b (FIG. 3) to support the first filter 51a. The supporter 65 may be formed to project inward to prevent deviation of the first filter 51a.

The second filter installation unit 62 is formed for the second filter 51b to be installed therein.

The second filter installation unit 62 includes a second filter hole 60c formed on the back of the housing 60a.

The second filter hole 60c is formed for the air that passed through the second filter 51b to move toward the blower device 80. Although not shown, there may be a supporter 65 formed so as to extend inward toward the second filter hole 60c.

While the first filter hole 60b is shown to be circular-shaped herein, but the present disclosure is not limited thereto. For example, the first filter hole 60b may also be shaped like a rectangle or a pentagon.

The filter frame 60 includes the circuit-unit installation unit 63 to install a circuit unit 90 for controlling the air cleaner 1.

The circuit unit 90 includes a substrate housing 91 in which a circuit substrate (not shown) is arranged, and a substrate cover 92 formed to be detachably combined on the front of the substrate housing 91.

The circuit-unit installation unit 63 has a room that has a matching size and shape to contain the circuit unit 90.

Furthermore, on the circuit-unit installation unit 63, there may be a wire installation unit 64 formed for wires (not shown) for connecting the circuit unit 90 to pass through.

The circuit-unit installation unit 63 is arranged in front of the filter frame 60, and thus may be revealed right after detachment of the front panel 20.

While in the embodiment of the present disclosure the circuit-unit installation unit 63 is shown to be placed in the middle between the first filter installation unit 61 and the second filter installation unit 62, the present disclosure is not limited thereto. For example, the circuit-unit installation unit 63 may also be arranged in the upper or lower part of the filter frame 60.

The filter frame 60 may be fixed onto the case 10 by a fixer 93. The fixer 93 may include a first fixer 93a formed in the filter housing 60a of the filter frame 60, and a second fixer 93b formed in the case.

The first fixer 93a includes at least one or more projections, and the second fixer 93b includes at least one or more grooves corresponding to the at least one or more projections. While in the embodiment of the present disclosure the projections are formed to project downward from the back of the filter housing 60a and the grooves are formed to have the projections inserted therein, the present disclosure is not limited thereto. The fixer 93 may include a hook, for example.

The air that passed through the filter unit 50 flows in to the duct unit 70 through the first and second filter holes 60b and 60c of the filter frame 60.

The duct unit 70 includes a first duct 71 that builds a first fluid path 100, and a second duct 72 that builds a second fluid path 200.

The first and second ducts 71 and 72 include fan guards 72a and 71a, respectively, for inflow of the air delivered from the filter unit 50. The first fan guard 71a is formed in the first duct 71 and the second fan guard 72a is formed in the second duct 72.

The first and second fan guards 71a and 72a may be formed at positions corresponding to the first and second filter holes 60b and 60c of the filter frame 60, respectively.

The first and second ducts 71 and 72 may each include a blower device 80. The blower device 80 may include a first blower 81 installed in the first duct 71, and a second blower 82 installed in the second duct 72.

The blower devices 80 include first and second blower fans 83a and 83b, and first and second driving motors 84a and 84b for driving the first and second blower fans 83a and 83b, respectively. The first and second blower fans 83a and 83b are formed to be rotated by rotational forces delivered from the first and second driving motors 84a and 84b.

The blower fans 83a and 83b may each include a centrifugal fan that sucks air in the axial direction and releases the air in the radial direction.

The first blower fan 83a is installed in the first fan guard 71a of the first duct 71. The first duct 71 may include a first air current exit 70a formed at a position corresponding to the first outlet 41 of the case 10.

The first air current exit 70a of the first duct 71 is formed on either sides of the case 10 to correspond to the first outlet 41.

The first duct 71 may include a first air current guide 71b to guide the air current released from the first blower fan 83a. The first air current guide 71b is formed to guide the air delivered from the first blower fan 81 toward the first air current exit 70a.

The second duct 72 may include a second air current exit 70b formed at a position corresponding to the second outlet 42 of the case 10. The second air current exit 70b of the second duct 72 may be formed to be directed toward the top of the case 10 to correspond to the second outlet 42.

The second duct 72 includes a second air current guide 72b formed to guide air current released from the second blower fan 83b. The second air current guide 72b is formed to guide the air delivered from the second blower fan 83b toward the second air current exit 70b.

The first and second ducts 71 and 72 are separately formed. The first and second ducts 71 and 72 are formed to build the first and second fluid paths 100 and 200.

The first fluid path 100 formed by the first duct 71 sucks air with the first blower 81 and releases the air to the first outlet 41 of the case 10 through the first air current exit 70a.

The first fluid path 100 includes a first air-inflow fluid path 110 formed by the first fan guide 71a, and a first air-outflow fluid path 120 formed by the first air current exit 70a.

The second fluid path 200 formed by the second duct 72 sucks air with the second blower 82 and releases the air to the second outlet 42 of the case 10 through the second air current exit 70b.

The second fluid path 200 includes a second air-inflow fluid path 210 formed by the second fan guide 72b, and a second air-outflow fluid path 220 formed by the second air current exit 70b.

The first and second fluid paths 100 and 200 may be partitioned and separately formed.

For this, there may be a partition wall 74 formed between the first and second ducts 71 and 72. The partition wall 74 may be formed between the first and second ducts 71 and 72 to separate the first and second fluid paths 100 and 200.

There may be at least one or more partition walls 74. In the embodiment, the partition wall 74 is shown to have a first partition wall 74a constituting the top of the first duct 71 and a second partition wall 74b constituting the bottom of the second duct 72, but the present disclosure is not limited thereto. For example, the partition wall may be formed of a plank as a partition between the first and second ducts.

An ion generator 95 for generating ions may be installed on the first and second fluid paths 100 and 200 formed by the first and second ducts 71 and 72.

Specifically, the ion generator 95 may be located on the first air-outflow fluid path 120 and the second air-outflow fluid path 220.

Ions generated by the ion generator 95 may be discharged to the first and second exits 41 and 42 of the case 10 through the first and second fluid paths 100 and 200 with the purified air, thus improving the air purification efficiency.

Figure 6:
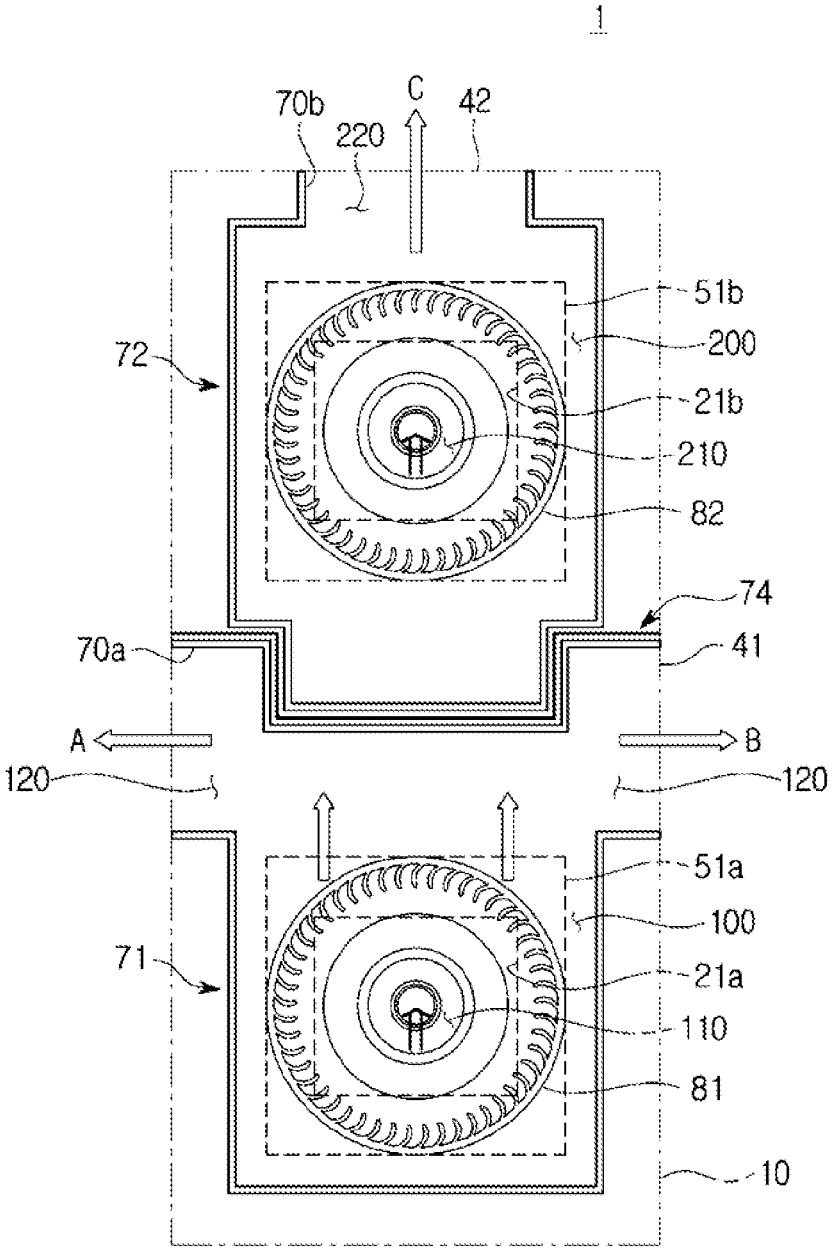
FIG. 6 conceptually shows an air cleaner having independent fluid paths, according to an embodiment of the present disclosure.

FIG. 6 conceptually shows an air cleaner having independent fluid paths, according to an embodiment of the present disclosure.

The air cleaner 1 includes the duct unit 70 installed inside the case 10. The duct unit 70 includes the first duct 71 forming the first fluid path 100, and the second duct 72 forming the second fluid path 200 independent from the first fluid path 100.

The first and second ducts 71 and 72 receive air through the first and second air inlets 21a and 21b, respectively, which are formed on the front panel 20 located in front of the case 10.

The air flowing into the first air inlet 21a is filtered by the first filter 51a, and the air flowing into the second air inlet 21b is filtered by the second filter 51b.

The filtered air flowing into the first fluid path 100 through the first air inlet 21a is sucked from the front of the first blower 81 and delivered toward the first air current exit 70a of the first duct 71.

The first air current exit 70a of the first duct 71 is formed to correspond to the first exit 41 formed on either sides of the case 10.

Accordingly, the air of the first fluid path 100 may be released out of the case 10 through the first air current exit 70a of the first duct 71 and the first outlet 41.

The filtered air flowing into the second fluid path 200 through the second air inlet 21b is sucked from the front of the second blower 82 and delivered toward the second air current exit 70b of the second duct 72.

The second air current exit 70b of the second duct 72 is formed to correspond to the second exit 42 formed on the top of the case 10.

Accordingly, the air of the second fluid path 200 may be released out of the case 10 through the second air current exit 70b of the second duct 72 and the second outlet 42.

As such, the air cleaner 1 that sucks external air ahead of the front panel 20 may release purified air in multiple directions through the first outlet 41 on the left and right sides and the second outlet 42 on the top without spatial constraint, thereby increasing air-purifying rates.

Moreover, with independent first and second fluid paths 100 and 200, simultaneous and individual driving of sucking and releasing functions are enabled through the first and second fluid paths 100 and 200, and thus the purification efficiency may be more improved.

Figure 7:
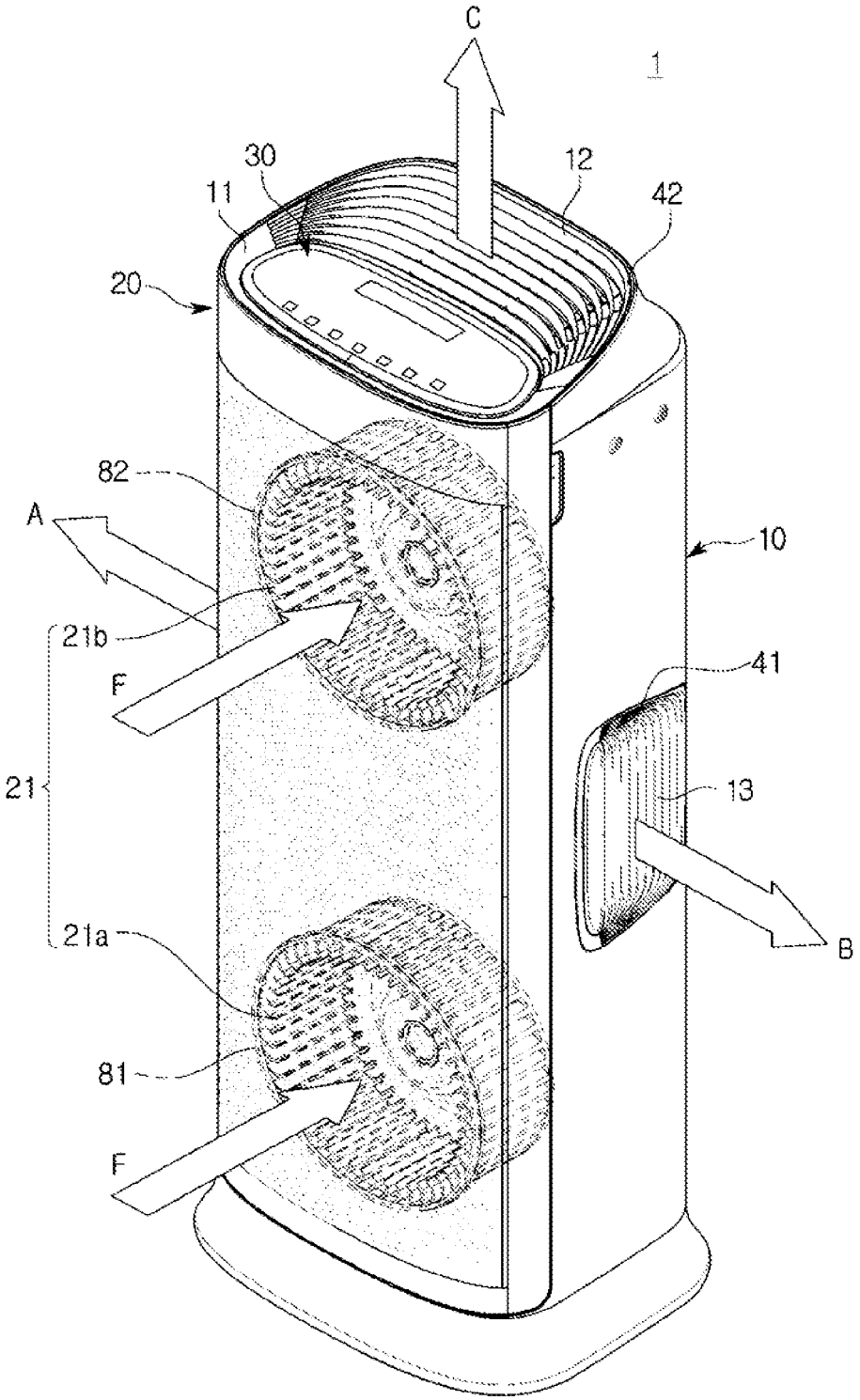
FIG. 7 shows operation of an air cleaner, according to an embodiment of the present disclosure.
Figure 8:
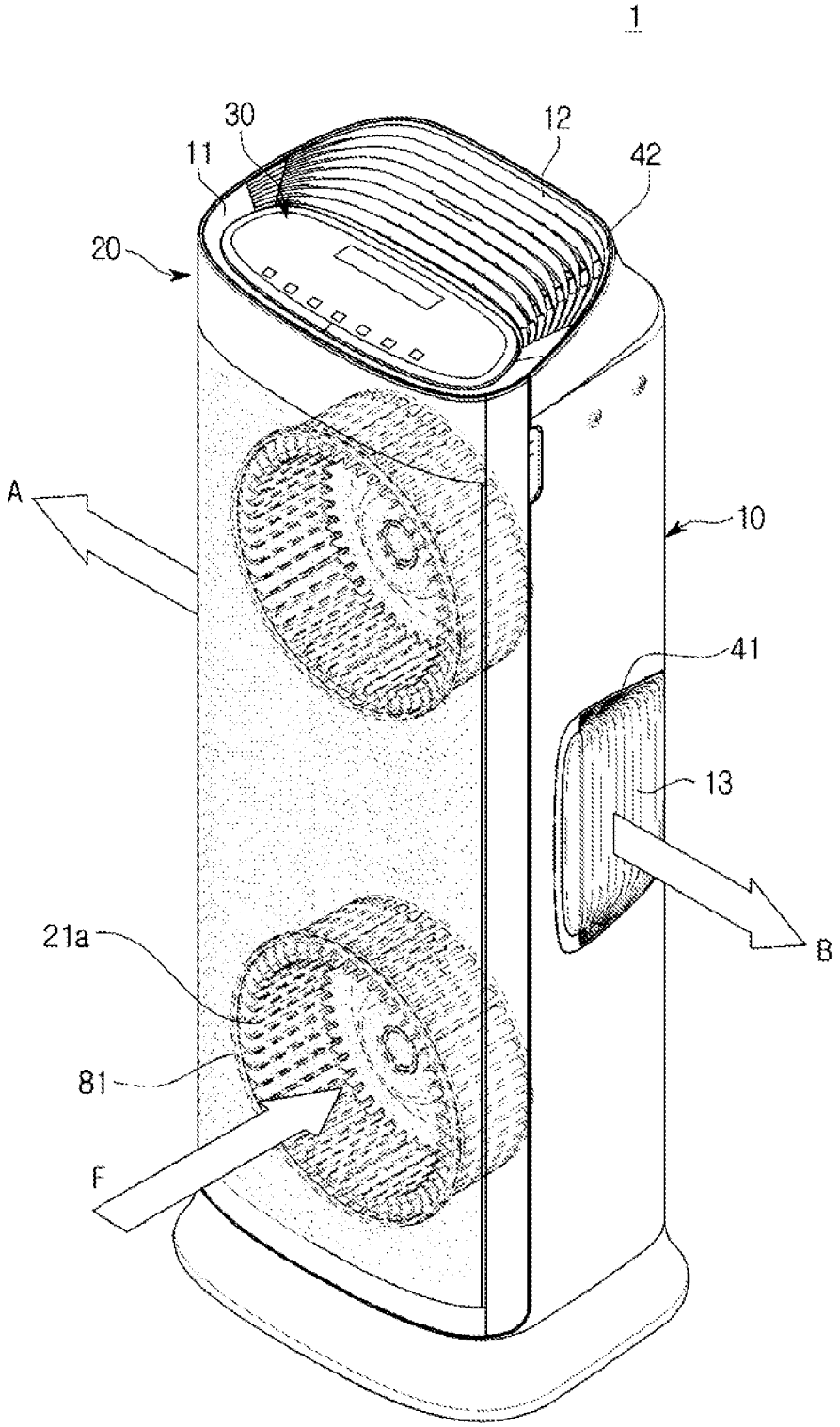
FIG. 8 shows air currents during operation of a first blower device of an air cleaner, according to an embodiment of the present disclosure.
Figure 9:
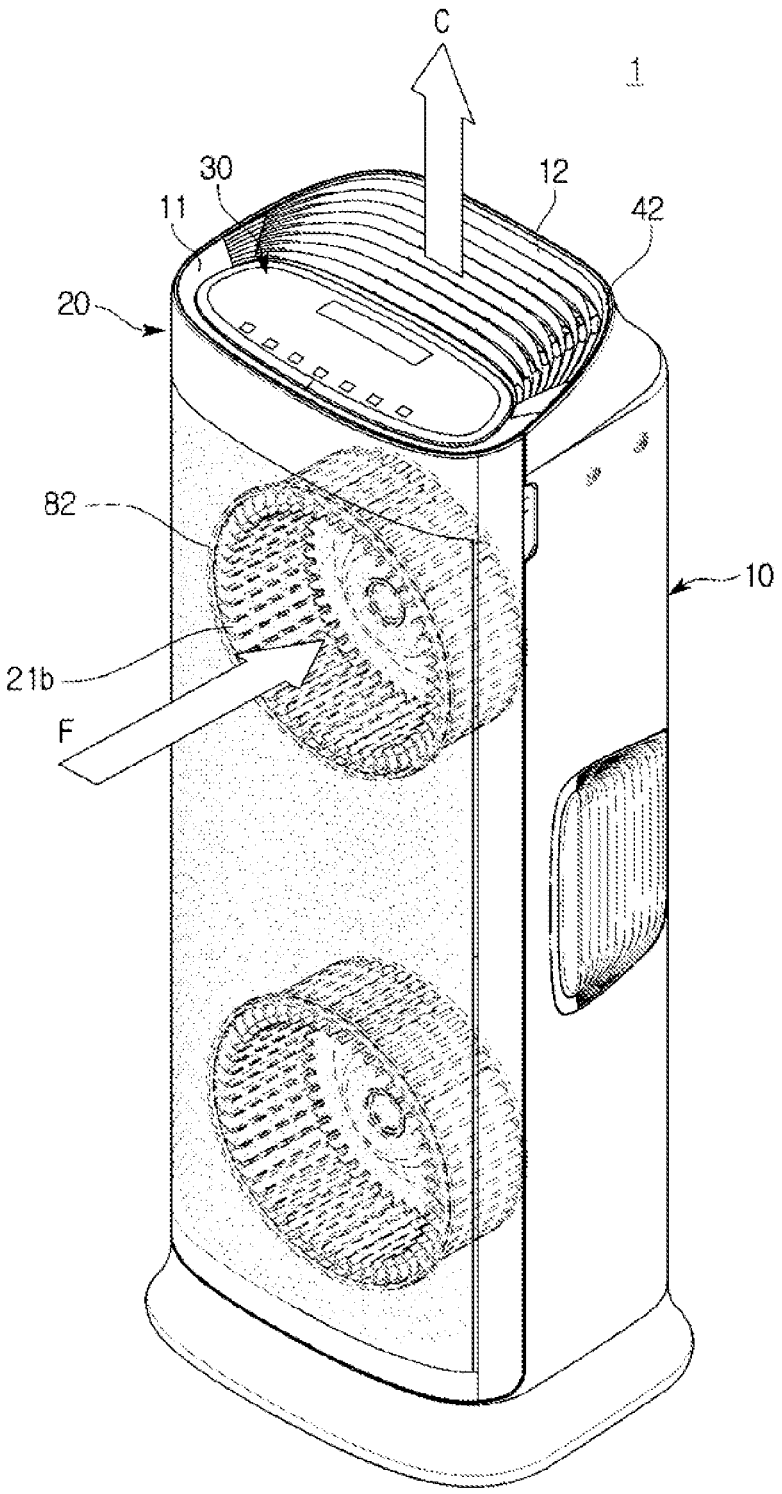
FIG. 9 shows air currents during operation of a second blower device of an air cleaner, according to an embodiment of the present disclosure.

FIG. 7 shows operation of an air cleaner, according to an embodiment of the present disclosure, FIG. 8 shows air currents during operation of a first blower device of an air cleaner, according to an embodiment of the present disclosure, and FIG. 9 shows air currents during operation of a second blower device of an air cleaner, according to an embodiment of the present disclosure.

Referring to FIGS. 7 to 9, there is the button control unit 31 (FIG. 1) of the control unit 30 that allows the user to manipulate operations of the air cleaner 1.

The user may set a level of the air purifying function by considering air pollution in the room. For example, for an intense purifying function, the first and second blowers 81 and 82 may both be driven for the filtered air to be released through the first and second outlets 41 and 42.

Specifically, the first and second blowers 81 and 82 are driven simultaneously, and thus the air that flowed into the first and second air inlets 21a and 21b of the front panel 20 from ahead (F illustrated in at least FIGS. 7, 8 and 9) flows to the inside of the case 10 and passes the first and second filters 51a and 51b. The filtered air flows into the first and second fluid paths 100 and 200, and the air of the first fluid path 100 is released both to the left and right of the case 10 through the first air current exit 70a and the first outlet 41. The air of the second fluid path 100 is released to the top (C illustrated in at least FIGS. 6, 7, 9, 13 and 14) of the case 10 through the second air current exit 70b and the second outlet 42.

For a weak purifying function, one of the first and second blowers 81 and 82 is driven while the other of them is turned off, in order for the filtered air to be released from only one of the first and second outlets 41 and 42.

If only the first blower 81 is driven, the purified air is released from the left and right sides of the case 10 through the first outlet 41, and if only the second blower 82 is driven, the purified air is released from the top (C illustrated in at least FIGS. 6, 7, 9, 13 and 14) of the case 10 through the second outlet 42.

Figure 10:
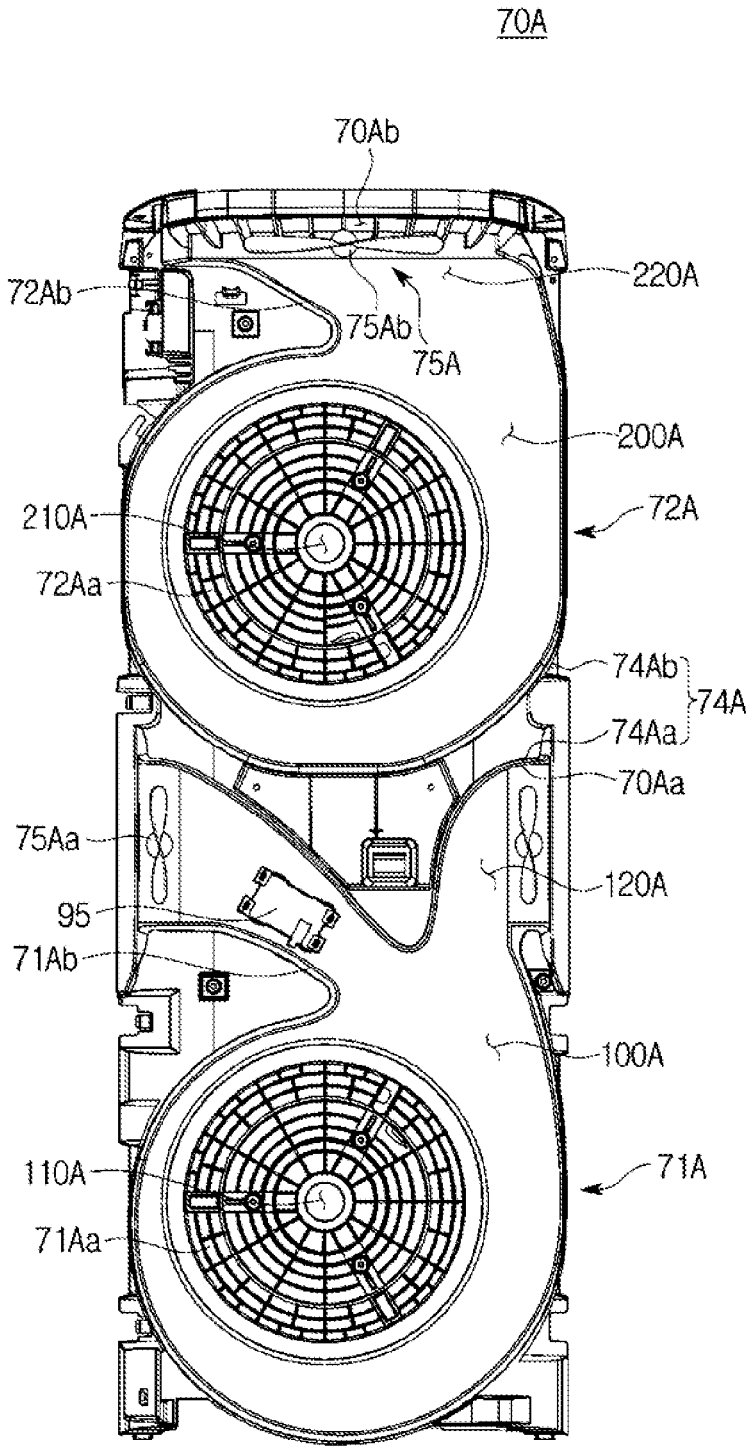
FIG. 10 is a perspective view schematically illustrating a duct unit, according to another embodiment of the present disclosure.
Figure 11:
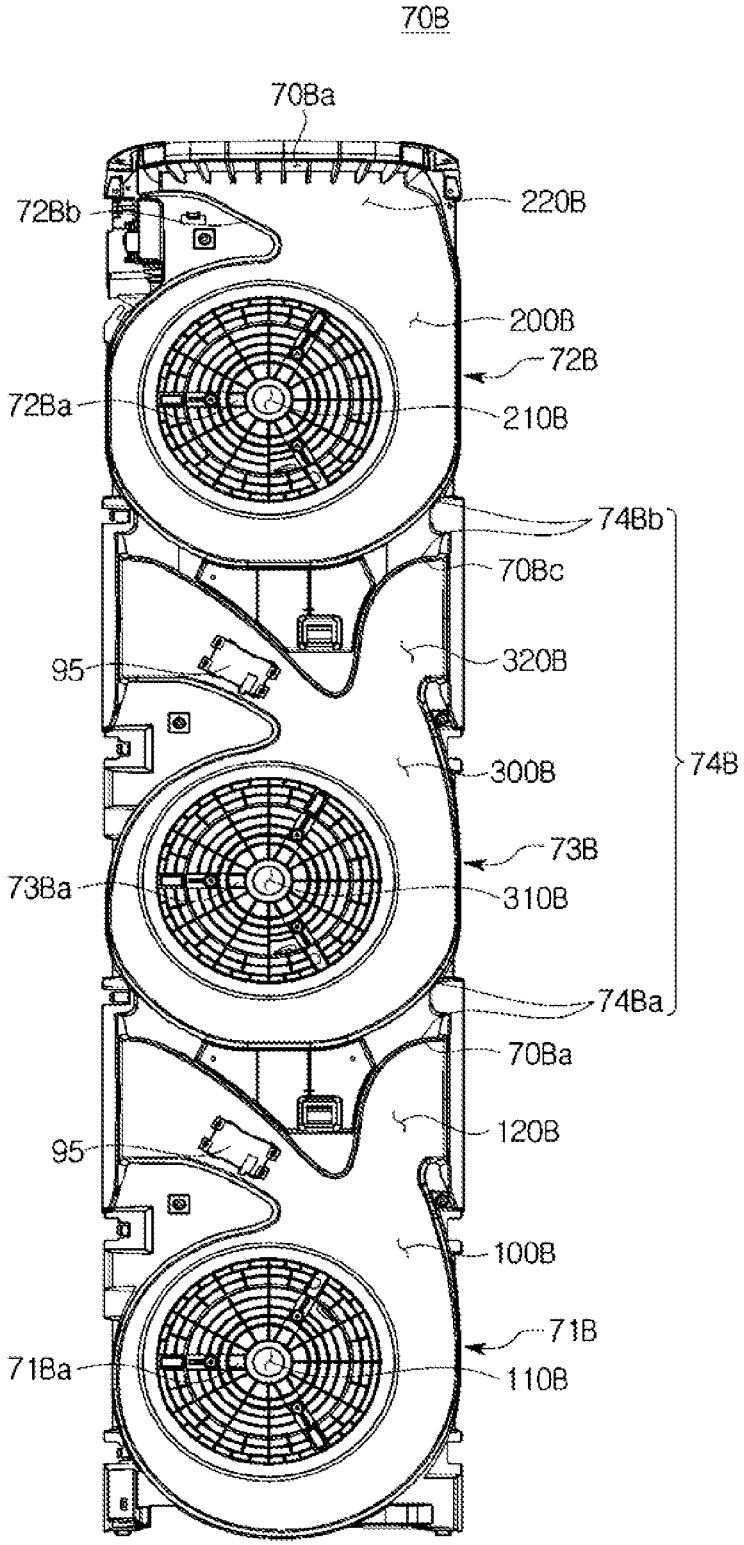
FIG. 11 is a perspective view schematically illustrating a duct unit, according to another embodiment of the present disclosure.
Figure 12:
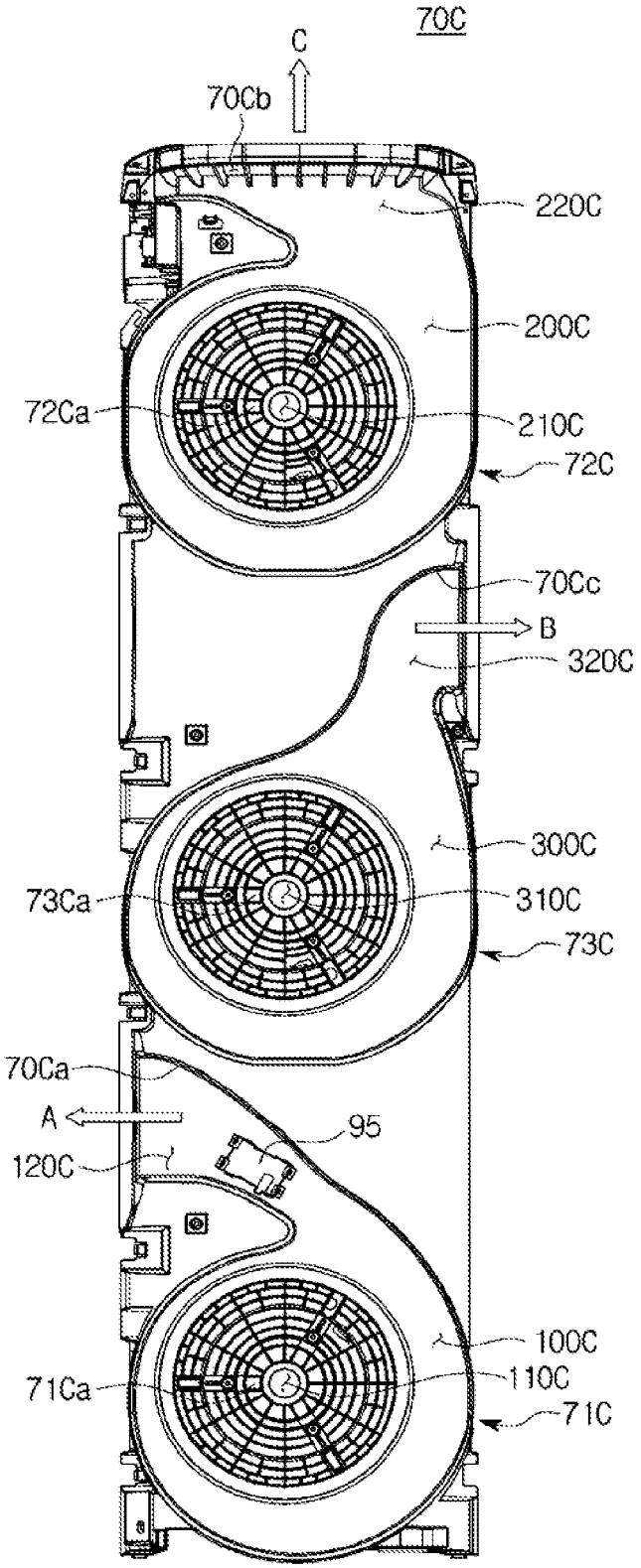
FIG. 12 is a perspective view schematically illustrating a duct unit, according to another embodiment of the present disclosure.

FIG. 10 is a perspective view schematically illustrating a duct unit, according to another embodiment of the present disclosure, FIG. 11 is a perspective view schematically illustrating a duct unit, according to another embodiment of the present disclosure, and FIG. 12 is a perspective view schematically illustrating a duct unit, according to another embodiment of the present disclosure.

Referring to FIG. 10, the first and second ducts 71 and 72 of the duct unit 70A may further include fans 75A for controlling the air release.

The first duct 71A is formed to build a first fluid path 100A that includes a first air-inflow fluid path 110A formed by a first fan guard 71Aa and a first air-outflow fluid path 120A formed by a first air current exit 70Aa.

The first air-outflow fluid path 120A of the first duct 71A may be arranged toward the left and right (A and B illustrated in at least FIG. 8) of the case 10 to correspond to the first outlet 41 of the case 10. The first duct 71A further includes an air current guide 71Ab that forms the first air-outflow fluid path 120A to release the air current to a first air current exit 70Aa. The air current guide 71Ab may be symmetrically formed for the air current to be guided both to the left and right of the case 10.

A first fan 75Aa may be mounted on the first air-outflow fluid path 120A of the first duct 71A to control air release through the first air current exit 70Aa and the first outlet 41.

The second air-outflow fluid path 220A of the second duct 72A may be arranged toward the top (C illustrated in at least FIGS. 6, 7, 9, 13 and 14) of the case 10 to correspond to the second outlet 42 of the case 10. The second duct 72A further includes a second air-inflow fluid path 210A formed by a second fan guard 72Aa, and an air current guide 72Ab that forms the second air-outflow fluid path 220A to release the air current through a second air current exit 70Ab. The air current guide 72Ab may be formed to be slanted at a predetermined angle toward the top such that the air current may be reliably guided to the top of the case 10.

A second fan 75Ab may be mounted on the second air-outflow fluid path 220A of the second duct 72A to control air release through the second air current exit 70Ab and the second outlet 42. While each of the first and second fans is shown to be a single one in this embodiment, the present disclosure is not limited thereto. For example, the number of fans to be formed on each air-outflow fluid path may vary depending on the size and shape of the air cleaner.

A partition wall 74A may be arranged between the first and second ducts 71A and 72A to separate the first and second fluid paths 100A and 200A. The partition wall 74A may include a first partition wall 74Aa to form the top section of the first duct 71A and a second partition wall 74Ab to form the bottom section of the second duct 72A. While in the embodiment the first and second partition walls 74Aa and 74Ab are shown to be integrally formed with the first and second ducts 71A and 72A, the present disclosure is not limited thereto. For example, the partition walls may be separately formed from the first and second ducts.

The first and second fluid paths 100 and 200 partitioned by the partition wall 74A are independently controllable, thus improving the air purifying efficiency.

Referring to FIG. 11, the duct unit 70B may include a first duct 71B, a second duct 72B, and a third duct 73B.

The first duct 71B may be formed to build a first fluid path 100B, the second duct 72B may be formed to build a second fluid path 200B, and the third duct 73B may be formed to build a third fluid path 300B. The second duct 72B further includes a second air-inflow fluid path 210B and a second fan guard 72Ba.

The first duct 71B is formed to build the first fluid path 100B that includes a first air-inflow fluid path 110B formed by a first fan guard 71Ba and a first air-outflow fluid path 120B formed by a first air current exit 70Ba.

The first air-outflow fluid path 120B of the first duct 71B may be arranged toward the left and right (A and B) of the case 10 to correspond to the first outlet 41 of the case 10.

The ion generator 95 may be installed on the first air-outflow fluid path 120B of the first duct 71B to produce ions for the purified air released through the first air current exit 70Ba. While in the embodiment the ion generator 95 is shown to be arranged in the first duct 71B, the ion generator 95 may be located in at least one of the first to third ducts 71B, 72B, and 73B.

The second air-outflow fluid path 220B of the second duct 72B may be arranged toward the top (C) of the case 10 to correspond to the second outlet 42 of the case 10. The second duct 72B further includes an air current guide 72Bb that builds the second air-outflow fluid path 220B to release the air current through the second air current exit 70Bb. The air current guide 72Bb may be formed to be slanted at a predetermined angle toward the top such that the air current may be reliably guided to the top of the case 10.

The third duct 73B arranged between the first and second ducts 71B and 72B is formed to build a third fluid path 300B that includes a third air-inflow fluid path 310B formed by a third fan guard 73Ba and a third air-outflow fluid path 320B formed by a third air current exit 70Bc.

The third air-outflow fluid path 320B of the third duct 73B may be formed on either sides of the case 10. The third air-outflow fluid path 320B may be formed at a predetermined distance upward from the first outlet 41.

Partition walls 74B may be arranged between the first and third ducts 73B and between the second and third ducts 72B and 73B to separate the first, second, and third fluid paths 100A, 200A, and 300A. The partition walls 74B may include a first partition wall 74Ba to form a top section of the first duct 71B or a bottom section of the third duct 73B, and a second partition wall 74Bb to form a bottom section of the second duct 72B or a top section of the third duct 73B.

As such, each of the first, second and third fluid paths 100B, 200B, and 300B independently formed in the case 10 of the air cleaner 1 may be separately controlled, thus improving the air purifying efficiency.

Referring to FIG. 12, a duct unit 70C may include air current exits 70Ca, 70Cb, and 70Cc formed in different directions.

A first duct 71C may be formed to build a first fluid path 100C, a second duct 72C may be formed to build a second fluid path 200C, and a third duct 73C may be formed to build a third fluid path 300C.

The first duct 71C is formed to build a first fluid path 100C that includes a first air-inflow fluid path 110C formed by a first fan guard 71Ca and a first air-outflow fluid path 120C formed by a first air current exit 70Ca.

The first air-outflow fluid path 120C of the first duct 71C is formed toward one side A of the case 10.

The second duct 72C is formed to build a second fluid path 200C that includes a second air-inflow fluid path 210C formed by a second fan guard 72Ca and a second air-outflow fluid path 220C formed by a second air current exit 70Cb.

The second air-outflow fluid path 70Cb of the second duct 72C may be arranged toward the top (C) of the case 10.

The third duct 73C arranged between the first and second ducts 71C and 72C is formed to build a third fluid path 300C that includes a third air-inflow fluid path 310C formed by a third fan guard 73Ca and a third air-outflow fluid path 320C formed by a third air current exit 70Cc.

The third air-outflow fluid path 320C of the third duct 73C is formed toward the other side B of the case 10.

As such, each of the first, second and third fluid paths 100C, 200C, and 300C independently formed in the case 10 of the air cleaner 1 may be independently controlled because of the air current exits 70Ca, 70Cb, and 70Cc formed in different directions, thus improving the air purifying efficiency.

While a filter unit for air purification is shown to be placed on each of the first and second fluid paths, the present disclosure is not limited thereto. For example, different air processing units 300D and 400E may be placed on the first and second fluid paths 100C and 200C, respectively, which are separately formed in the case 10.

Figure 13:
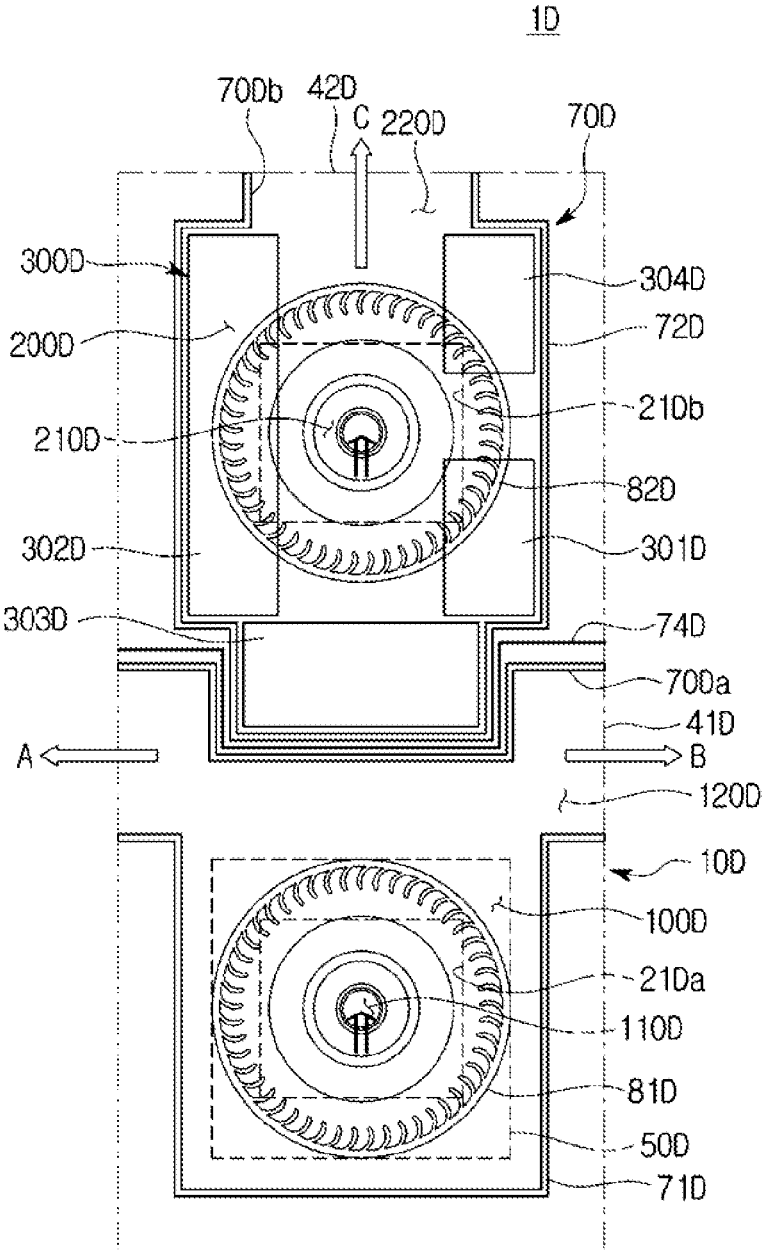
FIG. 13 conceptually shows a home appliance in which a dehumidifier and an air cleaner are built, according to an embodiment of the present disclosure.
Figure 14:
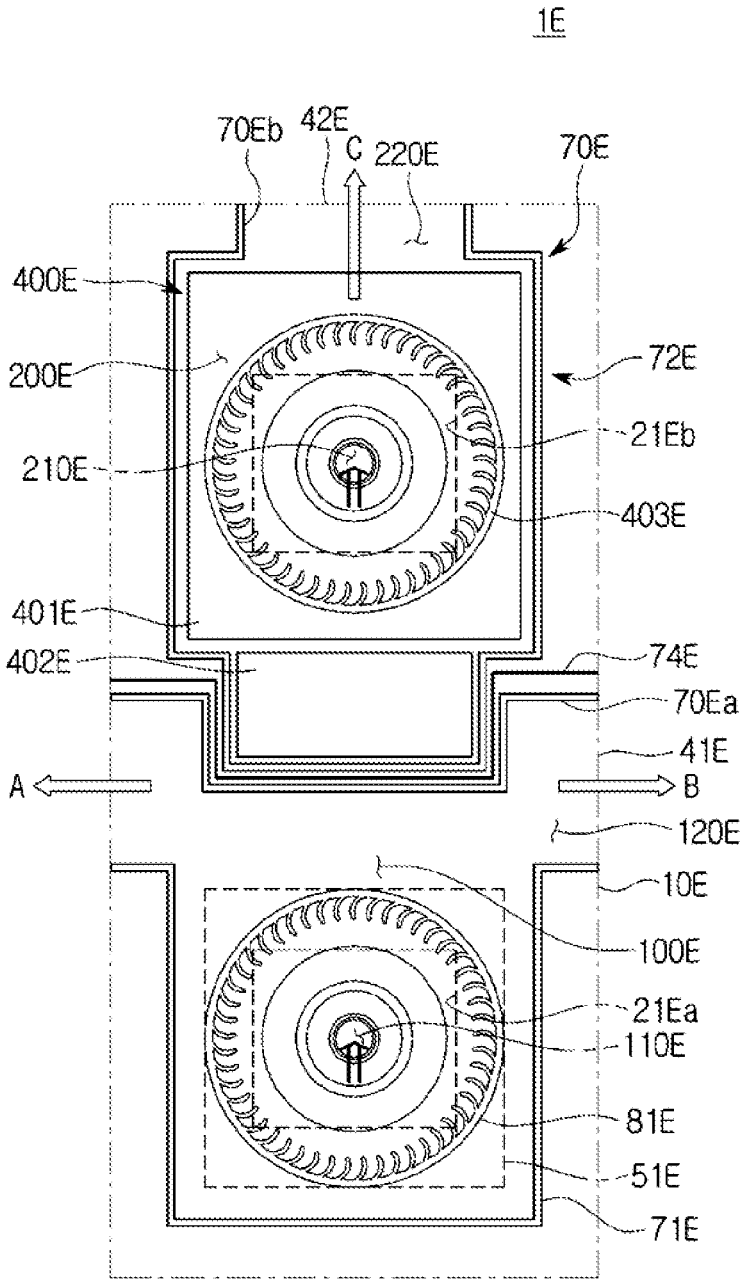
FIG. 14 conceptually shows a home appliance in which a humidifier and an air cleaner are built, according to an embodiment of the present disclosure.

FIG. 13 conceptually shows a home appliance in which a dehumidifier and an air cleaner are built, according to an embodiment of the present disclosure, and FIG. 14 conceptually shows a home appliance in which a humidifier and an air cleaner are built, according to an embodiment of the present disclosure.

Referring to FIG. 13, a dehumidifier 300D with a dehumidifying function may be placed on a second fluid path 200D of a home appliance 1D.

The home appliance 1D includes a case 10D, a first outlet 41D and a second outlet 42D, a first air inlet 21Da, a second air inlet 21Db, and a duct unit 70D formed inside the case 10D.

The duct unit 70D may include a first duct 71D formed to build a first fluid path 100D, and a second duct 72D placed above the first duct 71D, building a second fluid path 200D separated and independently formed from the first fluid path 100D.

A blower device 81D is installed in the first duct 71D to allow the air that flew in through a first air inlet 21Da to flow in after being filtered by a filter unit 50D, and the air flowing in by the blower device 81D is released to a first air current exit 70Da through the first air-inflow fluid path 110D and first air-outflow fluid path 120D of the first fluid path 100D.

The first air current exit 70Da of the first duct 71D is formed toward the left and right of the case 10A.

The dehumidifier 300D is placed in the second duct 72D to dehumidify the inflowing air. The dehumidifier 300D of the second duct 72D may be located on the second fluid path 200D.

The second duct 72D includes a second air current exit 70Db formed toward the top of the case 10D such that the inflowing air may be released after being dehumidified.

The second fluid path 200D formed by the second duct 72D includes a second air-inflow fluid path 210D and a second air-outflow fluid path 220D.

The first and second fluid paths 100D and 200D are isolated from each other. The first and second fluid paths 100D and 200D may be isolated by a partition wall 74D arranged between the first and second ducts 71D and 72D.

On the first fluid path 100D on which the dehumidifier 300D is not placed, there may be configurations for air purification. The configurations for air purification are the same as what are described in the aforementioned embodiments, so the description of them will be omitted herein.

The dehumidifier 300D may include a compressor 301D for compressing refrigerants, an evaporator 302D for condensing the refrigerants to absorb external latent heat and condensing water vapor of the room air, a dehumidifier blower fan 82D for forcibly moving air such that the air is sucked through the second air-inflow fluid path 210D, dehumidified through the evaporator 302D, heated while passing through a condenser 304D, and then released through the second air current exit 70Db, and a water collecting tray 303D for collecting the condensed water that is falling down from the evaporator 302D.

While the dehumidifier 300D is shown to employ a method of refrigeration cycle in the embodiment of the present disclosure, the present disclosure is not limited thereto. For example, the dehumidifier may perform dehumidification in a method of using an absorbent (not shown). The absorbent may include zeolite, active carbon, silica gel, etc.

Accordingly, it is possible to implement respective structures with different functions on the first and second fluid paths 100D and 200D independently formed in the case 10D of the home appliance 1D, and thus to release filtered air through the first fluid path 100D while releasing dehumidified air through the second fluid path 200D, thereby improving efficiencies of the air cleaner.

While in the embodiments of the present disclosure the dehumidifier 300D is shown to be placed in the second duct 72D of the home appliance 1D, the present disclosure is not limited thereto. For example, the dehumidifier 300D may be placed in the first duct 71D as well.

Referring to FIG. 14, a humidifier 400E with a humidifying function may be installed in a second duct 72E of a duct unit 70E of a home appliance 1E. The home appliance 1E may include a first outlet 41E, a second outlet 42E, a first air inlet 21Ea and a second air inlet 21Eb.

The humidifier 400E may be placed in one of first and second ducts 71E and 72E of a case 10E.

In this embodiment, the humidifier 400E is installed on a second fluid path 200E. The second fluid path 200E includes a second air-inflow fluid path 210E and a second air-outflow fluid path 220E.

In the first duct 71E where the humidifier 400E is not placed, there may be configurations for air purification. The configurations for air purification are the same as what are described in the aforementioned embodiments, so the description of them will be omitted herein.

A blower device 81E is installed in the first duct 71E to allow the air from the first air inlet 21Ea to flow in after being filtered by a filter unit 51E and the air flowing in by the blower device 81E is released to a first air current exit 70Ea through the first air-inflow fluid path 110E and first air-outflow fluid path 120E of the first fluid path 100E. The first and second fluid paths 100E and 200E are isolated from each other. The first and second fluid paths 100E and 200E may be isolated by a partition wall 74E arranged between the first and second ducts 71E and 72E.

The second fluid path 200E is formed to evaporate the air of the second air-inflow fluid path 210E, i.e., the air flowing in from ahead of the case 10E and to release the evaporated air from the top of the case 10E through the second air current exit 70Eb of the second duct 72E.

The humidifier 400E may include a humidifying element 401E, a humidification water tank 402E formed to absorb humidification water, and a humidifying blower fan 403E formed for easy evaporation of the humidification water.

The humidifying element 401E may be a humidifying filter that absorbs the humidification water and may be formed of a fiber material. The humidification water in the humidification water tank 402E may be evaporated while climbing up the humidifying element 401E.

At this time, the humidifying blower fan 403E may forcibly move the air in order for the humidification water to be easily evaporated.

The second fluid path 200E on which the humidifier 400E is placed is isolated from the first fluid path 100E. The first and second fluid paths 100E and 200E may be partitioned by a partition wall 74E.

While the humidifier 400E is shown to employ a method of using the humidifying element in the embodiment of the present disclosure, the present disclosure is not limited thereto. For example, the humidifier may perform humidification using an ultrasound vibrator.

Accordingly, it is possible to implement respective structures with different functions on the first and second fluid paths 100E and 200E independently formed in the case 10E of the home appliance 1E, and thus to release filtered air through the first fluid path 100E while releasing dehumidified air through the second fluid path 200E, thereby improving efficiencies of the air cleaner.

According to the embodiments of the present disclosure, the home appliance and air cleaner has a frontal inflow fluid path free from spatial constraint and multi-directional outflow fluid paths that are independently formed, to properly remove or individually control contaminants for each space.

With the help of independent fluid paths, the air cleaner may attain best efficiencies.

Furthermore, with the frontal inflow fluid path free from spatial constraint and multi-directional outflow fluid paths independently formed, the air cleaner may not be spatially restricted and may thus have an improved installability.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An air cleaner, comprising:

[a case;

a panel having a plurality of air inlets formed on a front face of the panel for air to flow in from outside the case;]

*a first air inlet;* a first blower device arranged [inside the case] to force air to flow through [one of the plurality of air inlets] *the first air inlet*;

a first filter unit arranged to filter the air forced to flow through the [one of the plurality of air inlets] *first air inlet* by the first blower device;

a first outlet located on a side of the [case] *air cleaner* to release the air that [passed through] *was filtered by* the first filter unit out of the [case] *air cleaner*;

a first fluid path formed between the [one of the plurality of air inlets] *first air inlet* and the first outlet;

*a second air inlet;* a second blower device arranged [inside the case] to force air to flow through [a different one of the plurality of air inlets] *the second air inlet*;

a second filter unit arranged to filter the air forced to flow through the [different one of the plurality of air inlets] *second air inlet* by the second blower device;

a second outlet located on a top side of the [case] *air cleaner* to release the air that [passed through] *was filtered by* the second filter unit out of the [case] *air cleaner in a different direction than the air released by the first outlet*;

a second fluid path separated from the first fluid path and formed between the [different one of the plurality of air inlets] *second air inlet* and the second outlet[, where the air passed through the second filter is released to the outside of the case through the second outlet located on the top side of the case which is in a different direction than the air released through the first outlet];

*a control button configured to input a command and located on a top side of the air cleaner;* a filter frame *including*

*a first filter installation unit* configured to support the first filter unit *inside the first filter installation unit, with the first blower device being outside of the first filter installation unit, and a first filter hole of the filter frame being between the first filter unit and the first blower device,* and

*a second filter installation unit configured to support* the second filter unit *inside the second filter installation unit, with the second blower device being outside of the second filter installation unit, and a second filter hole of the filter frame being between the second filter unit and the second blower device, wherein the filter frame is disposed so that air forced to flow through the first air inlet by the first blower device flows along the first fluid path through the first filter unit supported inside the first filter installation unit, then through the first filter hole, then through the first blower device to the first outlet, and air forced to flow through the second air inlet by the second blower device flows along the second fluid path through the second filter unit supported inside the second filter installation unit, then through the second filter hole, then through the second blower device to the second outlet*; and a *control* circuit unit *to control the air cleaner,* accommodated in the filter frame *between the first filter unit and the second filter unit.*

2. The air cleaner of claim 1, wherein [the plurality of air inlets comprises]:

[a] *the* first air inlet *is* formed to suck external air through the first filter unit and the first blower device[;], and

[a] *the* second air inlet *is* formed to suck external air through the second filter unit and the second blower device, and the second air inlet *is* formed to be separate from the first air inlet.

3. The air cleaner of claim 1, further comprising:

a duct unit arranged [in the case] to guide air current, wherein the duct unit comprises at least one partition wall to separate the first fluid path and the second fluid path.

4. The air cleaner of claim 1, *further comprising:*

*a case; and*

*a panel having the first air inlet and the second air inlet formed on a front face of the panel,* wherein the filter frame is disposed between the case and the panel.

5. The air cleaner of claim [4] *1*, wherein the filter frame comprises:

at least one circuit-unit installation unit in which the *control* circuit unit is installed.

6. The air cleaner of claim 3, wherein the duct unit comprises:

a first duct arranged to build the first fluid path and having the first blower device installed therein; and a second duct arranged to build the second fluid path and having the second blower device installed therein, wherein the first duct and the second duct are partitioned from each other.

[7. The air cleaner of claim 6, wherein the first duct and the second duct include a plurality of air current exits formed at positions corresponding to the first outlet and the second outlet.]

8. The air cleaner of claim 1, wherein at least one of the first fluid path and the second fluid path includes an ion generator.

9. The air cleaner of claim 1, wherein at least one of the first fluid path and the second fluid path includes a dehumidifier.

10. The air cleaner of claim 1, wherein at least one of the first fluid path and the second fluid path includes a humidifier.

11. A home appliance, comprising:

[a case having one of] a plurality of air inlets[formed on a front face of the case to suck air to be filtered by a filter];

a first outlet arranged to release air through sides of the [case] *home appliance*;

a first fluid path formed between [the] one of the plurality of air inlets and the first outlet;

a first blower device arranged to forcibly move air of the first fluid path;

a second outlet arranged on a top of the [case] *home appliance* to release air flowing in through [the] *a different* one of the plurality of air inlets out of the top of the [case] *home appliance*;

a second fluid path separated from the first fluid path and formed between *the different* one of the plurality of air inlets and the second outlet;

a second blower device arranged to forcibly move air of the second fluid path;

an air processing unit arranged on at least one of the first fluid path and the second fluid path;

*a control button configured to input a command and located on a top side of the home appliance;* a filter frame *including*

*a first filter installation unit* configured to support [the] *a first* filter *unit inside the first filter installation unit, with the first blower device being outside of the first filter installation unit, and a first filter hole of the filter frame being between the first filter unit and the first blower device, and*

*a second filter installation unit configured to support a second filter unit inside the second filter installation unit, with the second blower device being outside of the second filter installation unit, and a second filter hole of the filter frame being between the second filter unit and the second blower device,*

*wherein the filter frame is disposed so that air of the first fluid path moved by the first blower device flows through the first filter unit supported inside the first filter installation unit, then through the first filter hole, then through the first blower device, and air of the second fluid path moved by the second blower device flows through the second filter unit supported inside the second filter installation unit, then through the second filter hole, then through the second blower device*; and a *control* circuit unit *to control the home appliance,* accommodated in the filter frame *between the first blower device and the second blower device*, wherein the air moved by the first blower device is directed to the sides of the [case] *home appliance* by the first fluid path and the air moved by the second blower device is directed to the top of the [case] *home appliance* by the second fluid path.

12. The home appliance of claim 11, wherein the air processing unit comprises at least one of a filter unit, a humidifier, and a dehumidifier.

13. The home appliance of claim 11, wherein the one of the plurality of air inlets includes a plurality of inlet holes.

14. The home appliance of claim 12, wherein the filter unit is arranged between the one of the plurality of air inlets and at least one of the first blower device and the second blower device[for filtering the inflowing air].

15. The home appliance of claim 12, [wherein the case includes] *further comprising:* a duct unit arranged to guide air current, and wherein the duct unit comprises:

a first duct arranged to build the first fluid path, a second duct arranged to build the second fluid path, and at least one partition wall arranged to separate the first duct and the second duct.

[16. The home appliance of claim 15, wherein the first duct and the second duct include a plurality of air current exits formed at positions corresponding to the first outlet and the second outlet.]

17. The air cleaner of claim 1, wherein the first blower device and the second blower device are separately controllable so that filtered air is released through one of the first outlet and the second outlet, or both the first outlet and the second outlet.

18. An air cleaner, comprising:

[at least one filter unit] *a first filter unit and a second filter unit* to filter air flowing through at least one inlet from outside a front of [a case of] the air cleaner;

a first outlet and a second outlet to release the filtered air in different directions, respectively, the first outlet located on a side [of the case] of the air cleaner and the second outlet located on a top [of the case] of the air cleaner;

a first fluid path[, arranged inside the case,] through which the filtered air is guided toward one of the first outlet and the second outlet;

*a first fan in the first fluid path;* a second fluid path[, arranged inside the case and] separate from the first fluid path, through which the filtered air is guided toward [another one] *the other* of the first outlet and the second outlet;

*a second fan in the second fluid path;*

*a control button configured to input a command and located on a top side of the air cleaner;* a filter frame *including*

*a first filter installation unit* configured to support the [at least one] *first filter unit inside the first filter installation unit, with the first fan being outside of the first filter installation unit, and a first filter hole of the filter frame being between the first filter unit and the first fan,*

*a second filter installation unit configured to support the second* filter unit *inside the second filter installation unit, with the second fan being outside of the second filter installation unit, and a second filter hole of the filter frame being between the second filter unit and the second fan,*

*wherein the filter frame is disposed so that air of the first fluid path flows along the first fluid path through the first filter unit supported inside the first filter installation unit, then through the first filter hole, then through the first fan, and air of the second fluid path flows along the second fluid path through the second filter unit supported inside the second filter installation unit, then through the second filter hole, then through the second fan*; and a *control* circuit unit *to control the air cleaner* accommodated in the filter frame, wherein the first fluid path and the second fluid path are separately controlled[and release the filtered air from the top of the case through the second outlet which is in a different direction than filtered air released through the first outlet].

*19. The air cleaner of claim 1, further comprising:*

*a fan in the second fluid path to control the air released by the second outlet.*

*20. The air cleaner of claim 1, wherein the control circuit unit comprises:*

*a circuit substrate,*

*a substrate housing in which the circuit substrate is accommodated, and*

*a substrate cover detachably coupled to the substrate housing.*

*21. The air cleaner of claim 1, further comprising:*

*a circuit-unit installation unit in which the control circuit unit is installed, the circuit-unit installation unit dis-*

*posed between the first filter unit and the second filter unit in a vertical direction; and*

*a wire installation hole formed in the circuit-unit installation unit to allow a wire connected to the control circuit unit to pass therethrough.*

*22. The air cleaner of claim 1, wherein the filter frame has an open front face through which the first filter unit is installable inside the first filter installation unit and the second filter is installable inside the second filter installation unit.*

*23. The air cleaner of claim 22, wherein each of the first filter unit and the second filter unit includes a filter having a net body to filter out dust.*

*24. An air cleaner comprising:*

*a case;*

*a plurality of air inlets for air to flow into the case from outside the case;*

*a first blower device inside the case to force air to flow through one of the plurality of air inlets;*

*a first filter unit inside the case to filter the air forced to flow through the one of the plurality of air inlets by the first blower device;*

*a first outlet located so as to release the air filtered by the first filter unit out of the case in a sideways direction from the case;*

*a second blower device inside the case to force air to flow through a different one of the plurality of air inlets;*

*a second filter unit inside the case to filter the air forced to flow through the different one of the plurality of air inlets by the second blower device;*

*a second outlet located so as to release the air filtered by the second filter unit out of the case in an upward direction from the case so that the air released by the second outlet is released in a different direction than the air released by the first outlet;*

*a filter frame, inside the case, and including*

*a first filter installation unit configured to support the first filter unit inside the first filter installation unit, with the first blower device being outside of the first filter installation unit, and a first filter hole of the filter frame being between the first filter unit and the first blower device, and*

*a second filter installation unit configured to support the second filter unit inside the second filter installation unit, with the second blower device being outside the second filter installation unit, and a second filter hole of the filter frame being between the second filter unit and the second blower device,*

*wherein the filter frame is disposed so that air forced to flow through the one of the plurality of air inlets by the first blower device flows through the first filter unit supported inside the first filter installation unit, then through the first filter hole, then through the first blower device to the first outlet, and air forced to flow through the different one of the plurality of air inlets by the second blower device flows through the second filter unit supported inside the second filter installation unit, then through the second filter hole, then through the second blower device to the second outlet; and*

*a control circuit unit to control the air cleaner, inside the case, accommodated in the filter frame between the first filter unit and the second filter unit.*

*25. The air cleaner of claim 24, wherein the plurality of air inlets are located at a front of the air cleaner.*

*26. The air cleaner of claim 25, wherein*

*the first outlet is located on at least one side of air cleaner, and*

*the second outlet is located on a top of the air cleaner.*

*27. The air cleaner of claim 24, wherein*

*the first outlet is located on at least one side of the air cleaner, and*

*the second outlet is located on a top of the air cleaner.*

*28. The air cleaner of claim 24, further comprising:*

*a top panel;*

*a control unit, on the top panel, configured to input commands from a user to operate the air cleaner, and*

*a display, on the top panel, configured to display an operating state of the air cleaner,*

*wherein the second outlet is located on the top panel.*

*29. The air cleaner of claim 24, further comprising:*

*a partition wall, inside the case, separating a flow path of the air forced to flow through the one of the plurality of air inlets to the first outlet from a flow path of the air forced to flow through the different one of the plurality of air inlets to the second outlet.*

* * * * *